United States Patent [19]
Hockley

[11] Patent Number: 6,135,242
[45] Date of Patent: *Oct. 24, 2000

[54] BRAKING SYSTEM FOR A VEHICLE HAVING A STROKE INDICATOR

[75] Inventor: Des Hockley, Thornhill, Canada

[73] Assignee: Mr. Safety-Check Systems, Inc., North York, Canada

[*] Notice: This patent is subject to a terminal disclaimer.

[21] Appl. No.: 08/908,054

[22] Filed: Aug. 11, 1997

Related U.S. Application Data

[63] Continuation-in-part of application No. 08/660,223, Jun. 3, 1996, Pat. No. 5,699,880.

[51] Int. Cl.⁷ .................................................. F16D 66/00
[52] U.S. Cl. ................................ 188/1.11 R; 188/1.11 W
[58] Field of Search ................................ 188/72.9, 71.8, 188/170, 1.11 W, 1.11 R; 184/105.3; 384/396; 403/157, 79; 116/208, 281

[56] References Cited

U.S. PATENT DOCUMENTS

| | | | |
|---|---|---|---|
| 799,531 | 9/1905 | Bryant | 92/5 R |
| 1,391,895 | 9/1921 | Haskell | 116/285 |
| 1,418,210 | 5/1922 | Souther | 116/283 |
| 1,522,062 | 1/1925 | Jeffries | 184/45.1 |
| 1,752,284 | 3/1930 | Trench | 267/268 |
| 1,786,638 | 12/1930 | Wadell | 33/610 |
| 2,098,014 | 11/1937 | Polston | 137/565.3 |
| 2,341,796 | 2/1944 | Kuna et al. | 33/610 |
| 2,366,144 | 12/1944 | Griswold | 137/496 |
| 2,428,086 | 9/1947 | Leighton | 403/157 |
| 2,438,463 | 3/1948 | Snader et al. | 92/13 |
| 2,439,569 | 4/1948 | Hathorn | 464/14 |
| 2,527,814 | 10/1950 | Hanssen | 92/59 |
| 2,567,151 | 9/1951 | Hornbostel | 267/67 |
| 2,614,333 | 10/1952 | Peters | 33/610 |
| 2,697,599 | 12/1954 | Vandal | 267/123 |
| 2,847,238 | 8/1958 | Bolling, Jr. | 403/154 |
| 2,855,212 | 10/1958 | Houser | 280/6.157 |
| 3,168,011 | 2/1965 | Baumann | 92/59 |
| 3,190,383 | 6/1965 | Fountain | 177/137 |
| 3,401,755 | 9/1968 | Frederick | 173/20 |
| 3,438,351 | 4/1969 | Kirkwood | 116/208 |
| 3,575,268 | 4/1971 | Kimata | 188/196 |
| 4,251,182 | 2/1981 | Schroeder | 414/723 |
| 4,279,214 | 7/1981 | Thorn | 116/208 |
| 4,583,071 | 4/1986 | Sebalos et al. | 340/453 |
| 4,757,300 | 7/1988 | Sebalos | 340/454 |
| 4,776,438 | 10/1988 | Schandelmeier | 188/1.11 W |

(List continued on next page.)

FOREIGN PATENT DOCUMENTS

| | | |
|---|---|---|
| 2143660 | 3/1973 | Germany . |
| 0146106 | 9/1920 | United Kingdom ................... 384/396 |
| 2021695 | 12/1979 | United Kingdom . |

*Primary Examiner*—Robert J. Oberleitner
*Assistant Examiner*—Thomas J. Williams
*Attorney, Agent, or Firm*—Philip C. Mendes da Costa; Bereskin & Parr

[57] ABSTRACT

In a braking system for a vehicle including a pressure chamber, a pushrod extending longitudinally outwards from the pressure chamber and movable when correctly adjusted between first and second positions, a brake assembly for braking the vehicle and a pivot member for pivotally mounting a portion of the brake assembly to a portion of the pushrod, the improvement comprising:

(a) an indicator adapted to be mounted for longitudinal movement with the pushrod;

(b) a reference member for marking one of the first and the second position, the reference member mounted in an opposed position to the indicator; and, (c) the pivot member comprising a clevis pin having an outer surface, first and second ends and at least one lubrication channel for providing grease to the outer surface adjacent at least one the portion of the brake assembly pivotally mounted on the clevis pin and the portion of the pushrod pivotally mounted on the clevis pin.

16 Claims, 8 Drawing Sheets

U.S. PATENT DOCUMENTS

| | | | |
|---|---|---|---|
| 4,800,991 | 1/1989 | Miller | 188/1.11 L |
| 4,879,964 | 11/1989 | Emerson, Jr. | 116/28 R |
| 4,991,310 | 2/1991 | Melia | 33/609 |
| 5,044,812 | 9/1991 | Ardelt et al. | 403/154 |
| 5,140,932 | 8/1992 | Goldfein et al. | 116/208 |
| 5,178,092 | 1/1993 | Schedin | 116/208 |
| 5,226,509 | 7/1993 | Smith | 188/1.11 W |
| 5,244,061 | 9/1993 | Hoyt et al. | 188/1.11 W |
| 5,320,198 | 6/1994 | Hoyt et al. | 188/1.11 W |
| 5,441,128 | 8/1995 | Hoyt | 188/1.11 W |
| 5,913,385 | 6/1999 | Thibodeau | 188/1.11 |

BRAKING SYSTEM FOR A VEHICLE HAVING A STROKE INDICATOR

This application is a continuation-in-part of U.S. patent application Ser. No. 08/660,223, filed on Jun. 3, 1996 now U.S. Pat. No. 5,699,880.

FIELD OF THE INVENTION

This invention relates to an improved braking system of, for example, trucks, trailers and the like. In one embodiment, the braking system incorporates a means for greasing the pivoting surfaces of an air brake system. In another embodiment, the braking system also includes an air brake adjustment indicator.

BACKGROUND OF THE INVENTION

Braking systems for vehicles (eg. trucks, trailers and the like) typically utilize an air brake system having a pressure chamber, a push rod extending longitudinally outwards from the pressure chamber, a brake arm and a clevis pin for pivotally mounting the brake arm to the push rod. When the brake pedal is depressed, air pressure increases in the pressure chamber. As the air pressure increases, a diaphragm contained in the pressure chamber deforms and exerts an outward pressure on the push rod. The deformation of the diaphragm causes the push rod to move outwardly from the pressure chamber, actuating the braking mechanism. When air brake systems are properly adjusted, the push rod extends from a first position (in which the brakes are not engaged) to a second position (in which the brakes are fully engaged). Over time, as the brakes are repeatedly applied, the distance travelled by the push rod may increase requiring the brake system to be adjusted.

Some braking systems include slack adjusters. The slack adjuster is used to take up the excess clearance, i.e. the slack, caused by lining and drum wear. However, it is still important to regularly monitor the distance travelled by the push rod since this provides information regarding the degree of wear of the braking systems. Further, some jurisdictions require the operator of a truck to inspect the adjustment of the braking system before the vehicle's first trip each day.

Various devices have been developed to assist in monitoring the adjustment of brake systems.

U.S. Pat. No. 4,279,214 (Thorn) discloses a brake ware indicator comprising a sleeve that loosely fits over the push rod of the pneumatic actuator of the brakes. The sleeve has an outside diameter permitting it to be received on the aperture of the actuator housing which slidably receives the push rod.

U.S. Pat. No. 4,776,438 (Shandelmeier) discloses an air brake adjustment indicator comprising a bracket having an elongated body portion. A base plate is provided at one end for mounting on the vehicle. A pointer is adjustably mounted on the bracket at a predetermined distance from the clevis pin of the brake system in a direction opposite the air chamber when the clevis pin is in its normal, rest position.

U.S. Pat. No. 4,879,964 (Emerson, Jr.) discloses an adjustment marker comprising a chain of predetermined length which is attached to the push rod. A snap is attached to one end of the chain and a clamp is attached to the other end. An indicator flag is attached to the chain near the snap so that, when the push rod travels further than the predetermined length, the snap will release and drop the indicator flag downwardly so as to be visible to the operator of the vehicle.

U.S. Pat. No. 5,244,061 (Hoyt et al No. 1) discloses an air brake stroke length gauge comprising a stroke length indicator and a reference marker. The stroke length indicator is mounted on the push rod to move therewith. The reference marker is fixedly attached to the air brake system adjacent to the push rod at a distance which corresponds to the appropriate stroke length for the brake system when properly adjusted.

U.S. Pat. Nos. 5,320,198 (Hoyt et al No. 2) and 5,441,128 (Hoyt) disclose air brake stroke length adjustment gauges utilizing markers provided on the slack adjuster to indicate brake wear.

One disadvantage of some of these devices is that some portions of the indicator devices are subject to movement or may fall off with use. For example, when a vehicle is being driven, the frame of the vehicle and parts attached thereto (eg. the brake and the adjustment gauge) undergo substantial vibrations. This could result in the position of the reference marker and the stroke length indicator of Hoyt et al moving and accordingly providing a false reading.

A further disadvantage of some of these devices is that a warning is only provided when the push rod extends too far. For example, the device of Emerson, Jr. only provides a warning when the snap releases and the flag falls.

A further disadvantage of some of the devices is that it is difficult for the operator to properly read the adjustment gauge. Adjustment gauges are mounted near the push rod. If the operator reads the gauge from an angle, then a false reading may be obtained. In addition, some of these devices are not readily adjustable and substantial time may be required to properly mount and set the gauges.

A final disadvantage of some of these devices is that over the lifetime of the braking system, the clevis pin tends to seize in either the yokes of the pushrod or the yoke of the slack adjuster or the brake arm. If the truck is not in use, then the clevis pin may become seized in the slack adjuster/brake arm and/or the yoke. If the truck is in regular use, then continual applications of the brake will assist in preventing the clevis pin becoming seized in then slack adjuster/brake arm. However, the clevis pin may still become seized in the yoke.

SUMMARY OF THE PRESENT INVENTION

In accordance with the instant invention there is provided, in a braking system for a vehicle including a pressure chamber, a pushrod extending longitudinally outwards from the pressure chamber and movable when correctly adjusted between first and second positions, a brake assembly for braking the vehicle and a pivot member for pivotally mounting a portion of the brake assembly to a portion of the pushrod, an improvement comprising:

(a) an indicator adapted to be mounted for longitudinal movement with the pushrod;

(b) a support member having a first portion and a second portion, the first portion adapted to be mounted to the vehicle, the support member configured to position the second portion opposite to the indicator;

(c) a first reference member positionable on the second portion of the support member for marking the first position and a second reference member positionable on the second portion of the support member for marking the second position;

(d) a locating member for positioning the first reference member in a preselected position relative to the second reference member;

(e) at least one locking member for releasably mounting the first and second reference members on the second portion, the locking member moveable between a first position in which the first and second reference members are fixed in position on the second portion of the support member and a second position in which the first and second reference members are moveable as a unit with respect to the indicator on the second portion; and, (f) the pivot member comprising a clevis pin having an outer surface, first and second ends and at least one lubrication channel for providing grease to the outer surface adjacent at least one the portion of the brake assembly pivotally mounted on the clevis pin and the portion of the pushrod pivotally mounted on the clevis pin.

In accordance with the instant invention there is also provided, in a braking system for a vehicle including a pressure chamber, a pushrod extending longitudinally outwards from the pressure chamber and movable when correctly adjusted between first and second positions, a brake assembly for braking the vehicle and a pivot member for pivotally mounting a portion of the brake assembly to a portion of the pushrod, an improvement comprising:

(a) an indicator adapted to be mounted for longitudinal movement with the pushrod;

(b) a reference member for marking one of the first and the second position, the reference member mounted in an opposed position to the indicator; and, (c) the pivot member comprising a clevis pin having an outer surface, first and second ends and at least one lubrication channel for providing grease to the outer surface adjacent at least one the portion of the brake assembly pivotally mounted on the clevis pin and the portion of the pushrod pivotally mounted on the clevis pin.

In one embodiment, the indicator is mounted on one end of the clevis pin. The clevis pin may have a grease nipple adapted for receiving lubricant from an automatic greasing system for the vehicle.

In a further embodiment, the clevis pin comprises a substantially cylindrical elongate body having a bore adapted to receive a grease nipple and, a lubrication channel network extending from the bore to the outer surface of the clevis pin.

In an alternate embodiment, the clevis pin comprises a substantially cylindrical elongate body having a bore adapted to receive a grease nipple and extending inwardly from the outer surface in the region of one of the ends and, a lubrication channel network which extends through the body, one end of which is positioned under, and which communicates with, the bore and at least one other end of which communicates with the outer surface at a point offset from the bore in the direction of the other end.

In accordance with the instant invention there is also provided, in a braking system for a vehicle including a pressure chamber, a pushrod extending longitudinally outwards from the pressure chamber and movable when correctly adjusted between first and second positions, a brake assembly for braking the vehicle and a pivot member for pivotally mounting a portion of the brake assembly to a portion of the pushrod, the pivot member and the portions of the brake assembly and the pushrod defining pivoting surfaces, an improvement comprising a clevis pin having:

(a) a substantially cylindrical elongate body having an outer surface and first and second ends;

(b) a bore adapted to receive a grease nipple and extending inwardly from an outer portion of the clevis pin in the region of the first end; and, (c) a lubrication channel network which extends through the body, one end of which communicates with the bore and at least one other end of which communicates with the outer surface at a point offset from the bore in the direction of the second end.

In one embodiment the grease nipple is adapted for receiving lubricant from an automatic greasing system for the vehicle, whereby on application of the automatic greasing system for the vehicle, the pivoting surfaces are lubricated.

In another embodiment the lubrication channel network comprises a first lubricant channel having a first end and a second end and extending axially within the body, the first lubricant channel communicating with the bore; and, a second lubricant channel having a first end and a second end and extending transversely through the cylindrical body, the second lubricant channel intersecting the first lubricant channel to be in communication therewith, at least one of the first and second ends of the second lubricant channel positioned adjacent the outer surface of the clevis pin to communicate therewith.

In another embodiment the first lubrication channel extends from the first end of the clevis pin towards the second end and the bore for receiving the grease nipple is positioned in the first end.

In another embodiment the first lubrication channel extends from the first end of the clevis pin towards the second end, the bore extends from the outer surface of the clevis pin to intersect the first lubricant channel and the first end of the first lubrication channel is provided with a lubricant plug which securely plugs the first end of the first lubrication channel.

In another embodiment the elongate body of the clevis pin also comprises an enlarged portion which is sized to accommodate the bore which is positioned therein and extends from the surface of the enlarged portion.

In another embodiment the elongate body has a retention cross-bore which is adapted to receive an axial retention member extends through and transversely to the axis of the cylindrical body in the region of one of the ends, the retention cross-bore having first and second ends which communicate with the outer surface. The retention cross-bore may be positioned on the second end of the clevis pin. The axial retention member may be a cotter pin.

One advantage of the instant adjustment indicator is that it provides a gauge for measuring not only the outward travel of the push rod but also the inward travel of the push rod. If the push rod extends too far outwardly, then this provides an indication, for example, that the brake pads are worn and need replacement. Alternately, if the push rod does not fully retract, then this provides an indication, for example, that the cam, the slack adjuster or the operating shaft is broken and/or worn or that there is a malfunction in the air chamber.

A further advantage of the instant adjustment indicator is that the indicator and the first or second reference members preferably interact when the indicator extends past a first or second reference members. This provides a positive visual signal, independent upon the angle from which the adjustment gauge is observed, that the brake system requires adjustment.

A further advantage of the instant invention is that it provides a greaseable clevis pin for operatively and pivotally connecting the yokes of a pushrod to the yoke of a brake arm of a vehicle braking system such that the contact surfaces may be provided with lubricant.

A further advantage of the present invention is that it provides a greaseable clevis pin for operatively and pivotally connecting the yokes of a pushrod to the yoke of a brake arm of a vehicle braking system and for receiving lubricant from an automatic greasing system for a truck, such that the contact surfaces are provided with lubricant supplied by the automatic greasing system.

DESCRIPTION OF THE DRAWING

These and other features of the instant invention will be more fully understood in reference with the following description of a preferred embodiment of the invention in which.

DESCRIPTION OF PREFERRED EMBODIMENT

Figure 1:
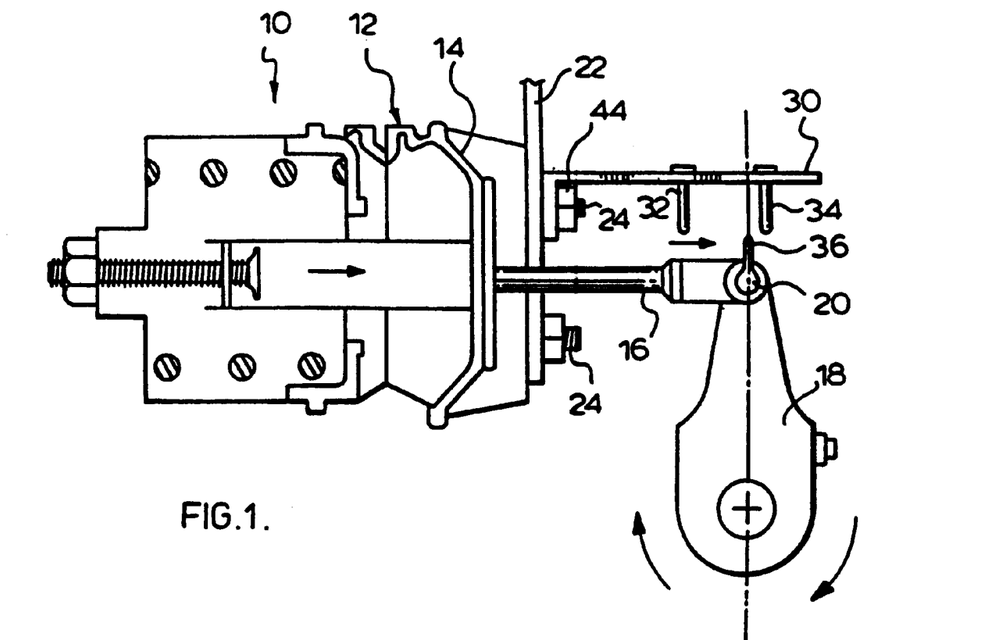
FIG. 1 is a partial cross-section of an air brake system having a brake adjustment indicator pursuant to the instant invention mounted thereon and showing a properly adjusted air brake system with the brake engaged.
Figure 2:
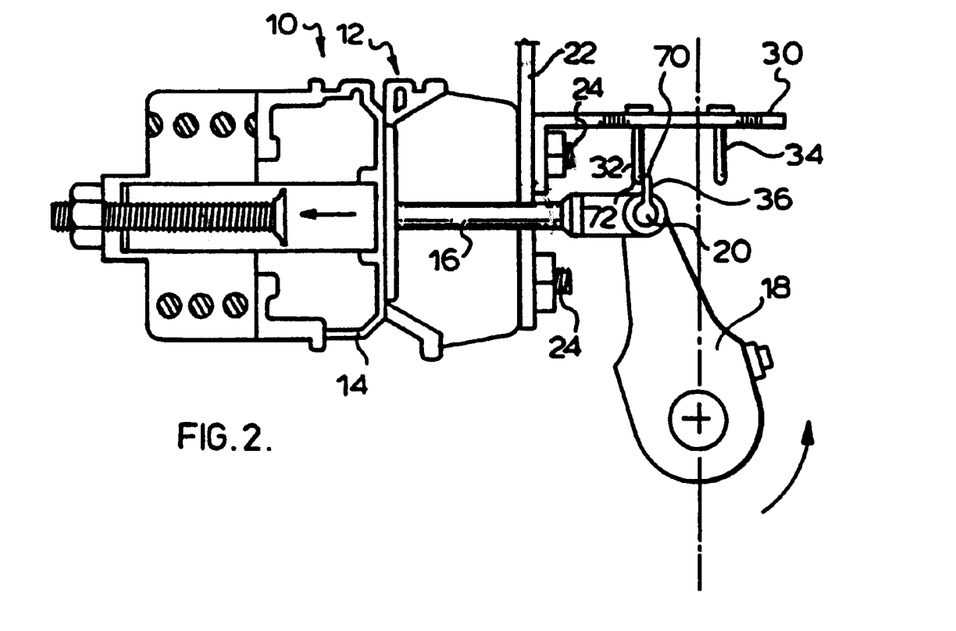
FIG. 2 shows the air brake system of FIG. 1 showing a properly adjusted air brake system with the brake disengaged.
Figure 3:
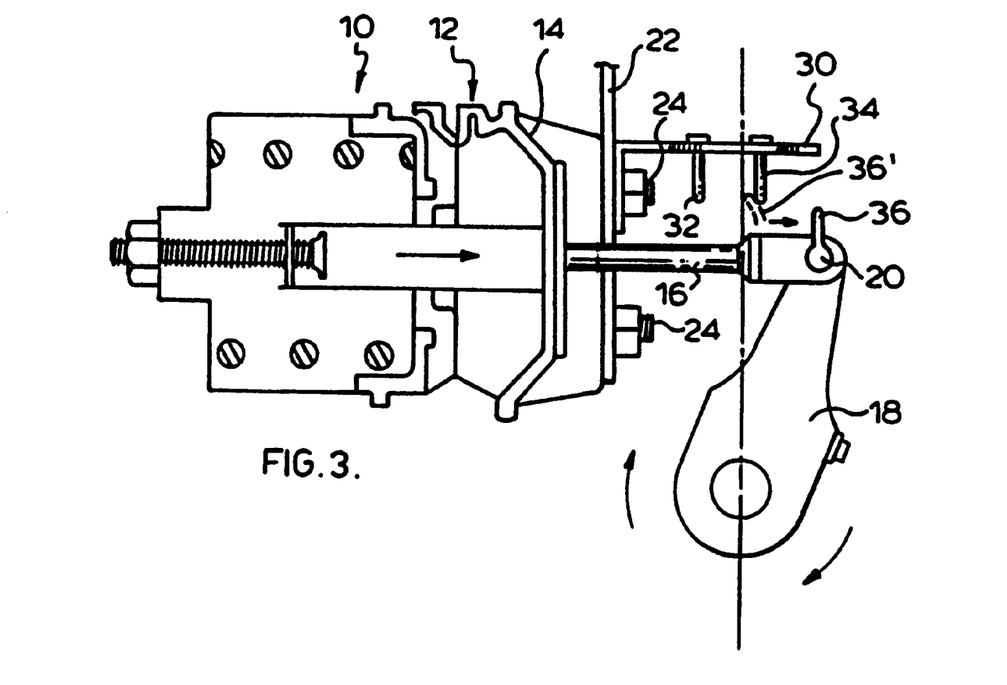
FIG. 3 shows the air brake system of FIG. 1 in which the air brake system requires adjustment.

As shown in FIGS. 1–3, braking systems for vehicles (eg. trucks, trailers and the like), generally designated by reference number 10, comprise a pressure chamber 12 having a diaphragm 14, a push rod 16 and a brake arm (which may be or which may include a slack adjuster) 18. Push rod 16 may abut against diaphragm 14 and move longitudinally into and out of pressure chamber 12 with the respective contraction or expansion of diaphragm 14. A brake arm or slack adjuster 18 is pivotally mounted by pivot means to push rod 16 about axis 20. Preferably, the pivot means is a clevis pin 64 (see FIG. 9). Brake arm 18 is connected to the braking assembly of a vehicle so that, upon movement of push rod 16, brake arm 18 causes the brake to engage or disengage, depending upon the direction of travel of push rod 16. Pressure chamber 12 may be affixed to the vehicle by any means known in the art. As shown in FIGS. 1–3, pressure chamber 12 may be affixed to vehicle frame 22 by means of mounting bolts 24.

The brake adjustment indicator according to the instant invention comprises bracket 30, first reference pointer 32, second reference pointer 34 and indicator 36. Indicator 36 is adapted to be mounted for longitudinal movement with push rod 16. Preferably, indicator 36 is adapted to be mounted to clevis pin 64. Indicator 36 may therefore be adapted to be mounted on clevis pin 64 or indicator 36 may be formed integrally with clevis pin 64.

Figure 4:
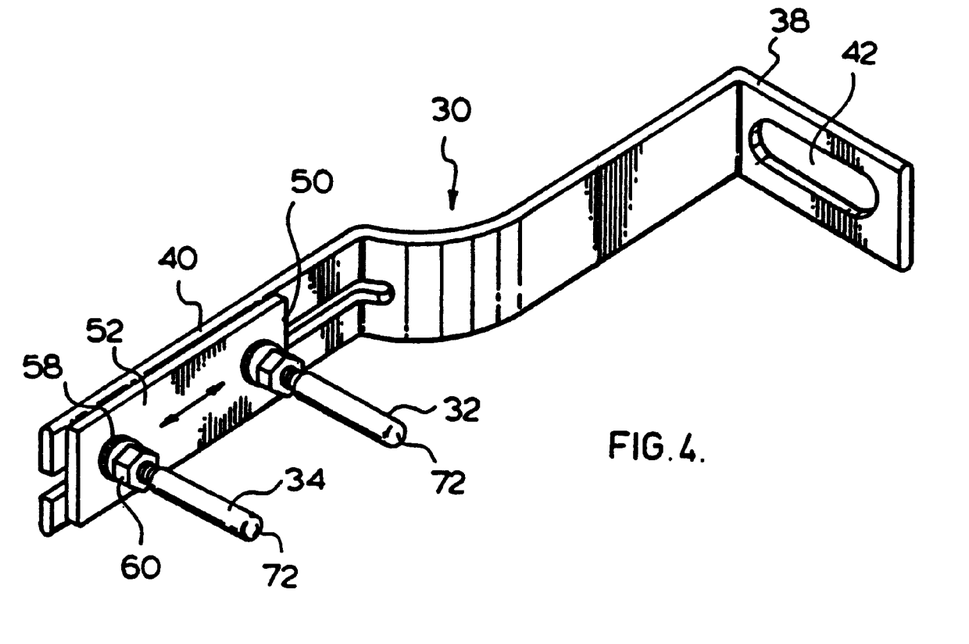
FIG. 4 is a perspective view of a support means according to the instant invention.

Bracket 30 is a support member which is adapted to be mounted to the vehicle. As shown in FIG. 4, the bracket has a first portion 38 which is adapted to mount bracket 30 on the vehicle and the second portion 40 which is adapted to receive first and second reference pointers 32 and 34.

Bracket 30 may be mounted on the vehicle by any means known in the art. As shown in FIG. 4, first portion 38 may have an opening 42 which is adapted to be mounted on bolt 24 as shown in FIGS. 1–3. In order to install bracket 30, nut 44 is removed from bolt 24, bracket 30 is placed so that bolt 24 extends through opening 42 and nut 44 is reapplied to bolt 24 to fix bracket 30 in position. Preferably, opening 42 is a longitudinally extending opening so that bracket 30 may be fixed to vehicle frame 22 in a variety of positions. Alternately, first portion 38 may have a plurality of openings provided therein, each of which are adapted to receive bolt 24.

Second portion 40 is adapted to receive reference pointers 32 and 34. Bracket 30 is configured so that reference pointers 32 and 34 are positioned opposite indicator 36. Bracket 30 may be a member which extends longitudinally from bolt 24 to a position opposite clevis pin 64. As shown in FIGS. 4 and 6–8, the exact configuration of bracket 30 may be varied, depending on the braking system which is used and the position at which bracket 30 is affixed to the vehicle, so that reference pointers 32 and 34 may mark the correctly adjusted position of push rod 16.

When correctly adjusted, the push rod of the braking system typically moves between a first inner position and a second outer position. For example, if indicator 36 is mounted on clevis pin 64 as shown in FIGS. 1–3, then, when the brakes are correctly adjusted, indicator 36 moves longitudinally with push rod 16 to a first particular distance from pressure chamber 12 when the brakes are applied and to a second particular distance from pressure chamber 12 when the brakes are released. The actual distance which is travelled and the inner and outer positions will depend upon the braking system which is used. Each manufacturer generally indicates the correct displacement of push rod 16 when it is properly adjusted.

Second portion 40 of bracket 30 is positioned opposite indicator 36 so that, when correctly adjusted, indicator 36 will travel with push rod 16 between first and second reference pointers 32 and 34. Bracket 30 is configured to so position second portion 40. Referring to FIGS. 1–3, reference pointer 32 extends longitudinally in the plane passing transversely through push rod 16 at the correctly adjusted inner position and reference pointer 34 extends longitudinally in the plane passing transversely through push rod 16 at the correctly adjusted outer position.

If indicator 36 extends outwardly past reference pointer 34, as shown in FIG. 3, this would indicate to the operator of the vehicle that there may be excessive wear on the brakes and that, for example, the brake pads may need replacement. If, on the other hand, the indicator travels so that it does not travel to a position adjacent reference pointer 32, then this would indicate to the operator of the vehicle that the cam, the slack adjuster or the operating shaft of the braking system may be worn or broken, that there is a malfunction in pressure chamber 12 or that other parts of the braking system require maintenance. Accordingly, one advantage of the instant invention is that it provides a reference mark for both the outward position of push rod 16 when it is correctly adjusted and the inward position of travel of push rod 16 when it is operating properly.

Figure 5:
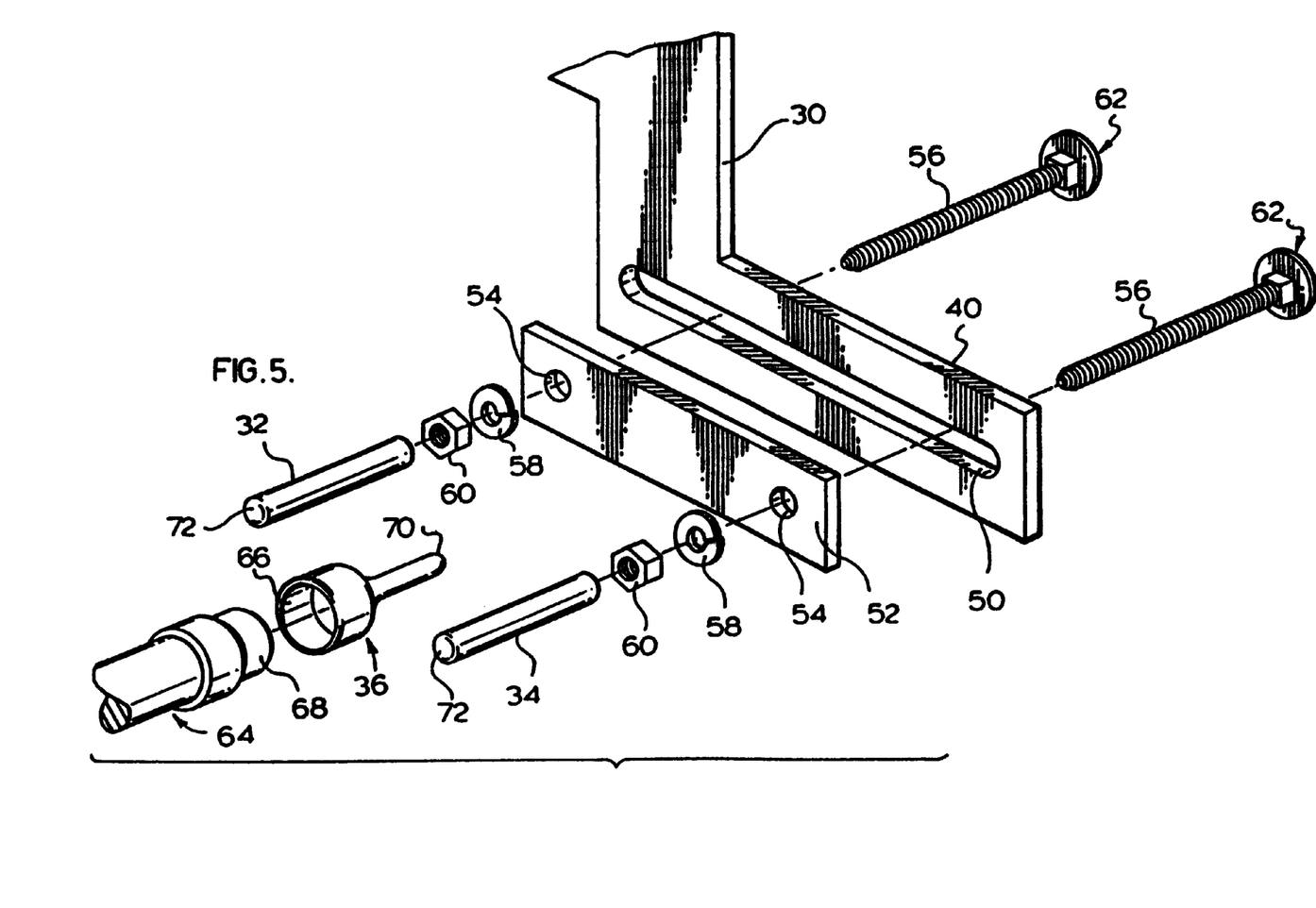
FIG. 5 is an exploded view of a support means according to the instant invention and an indicator means of the instant invention.

Referring to FIGS. 4 and 5, the construction of reference pointers 32 and 34 will be discussed. Reference pointers 32 and 34 are mounted on second portion 40 of bracket 30 a preselected distance apart. Further, reference pointers 32 and 34 are mounted for simultaneous movement as a unit on second portion 40. To this end, second portion 40 may have a longitudinally extending opening 50. Bracket 30 is configured so that opening 50 extends longitudinally, parallel to the direction of travel of push rod 16. A spacer, comprising plate 52 having openings 54, is provided. Reference pointers 32 and 34 are slidable mounted on second portion 40 by bolts 56 which extend through longitudinally extending opening 50, through an opening 54 and into one of the reference pointers. Locking means is also provided to releasably secure pointers 32 and 34 in position on second portion 40. Accordingly, lock washers 58 and nut 60 may be provided.

When assembled, distal end 62 of bolts 56 abuts against second portion 40. Bolts 56 pass through longitudinally extending opening 50, opening 54, lock washer 58 and nut 60 into one of reference pointers 32 and 34. By tightening nut 60 on bolt 56, plate 52, and accordingly reference pointers 32 and 34, are releasably fixed in position on bracket 30.

Openings 54 are provided a pre-selected distance apart. The pre-selected distance depends upon the permitted travel distance of push rod 16 when it is correctly adjusted. As the permitted distance of travel of push rod 16 varies, a different plate 52 having openings 54 spaced a different preselected distance apart may be utilized. Accordingly, another advantage of the instant invention is that bracket 30 may be adapted for different braking systems by switching to a different plate 52. It will also be appreciated by those skilled in the art that plate 52 may have a plurality of openings and that the plate may be appropriately marked to indicate those openings which are to be used with different braking systems. Alternately, a ruler or the like may be provided on plate 52 with the plurality of openings so that an appropriate pair of holes 54 may be selected depending upon the distance which push rod 16 may travel.

As also shown in FIG. 5, indicator 36 may comprise a hollow cylindrical member having an opening 66 which is adapted to fit onto end 68 of clevis pin 64. Alternately, it will be appreciated by those skilled in the art that clevis pin 64 may be integrally formed with indicator 36.

Figure 7:
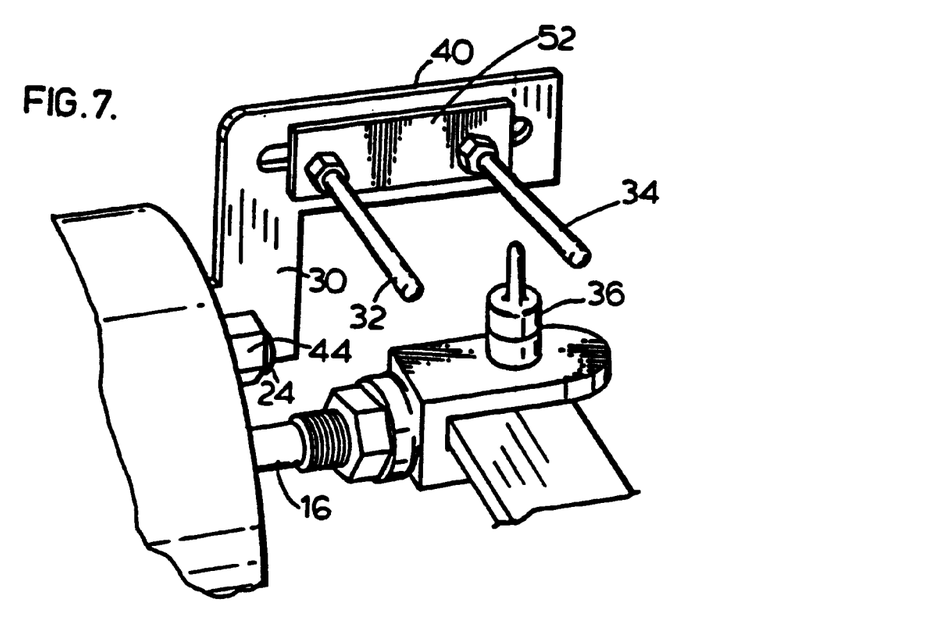
FIG. 7 is a perspective view of a brake adjustment indicator according to the instant invention mounted on a rear brake of a vehicle.
Figure 8:
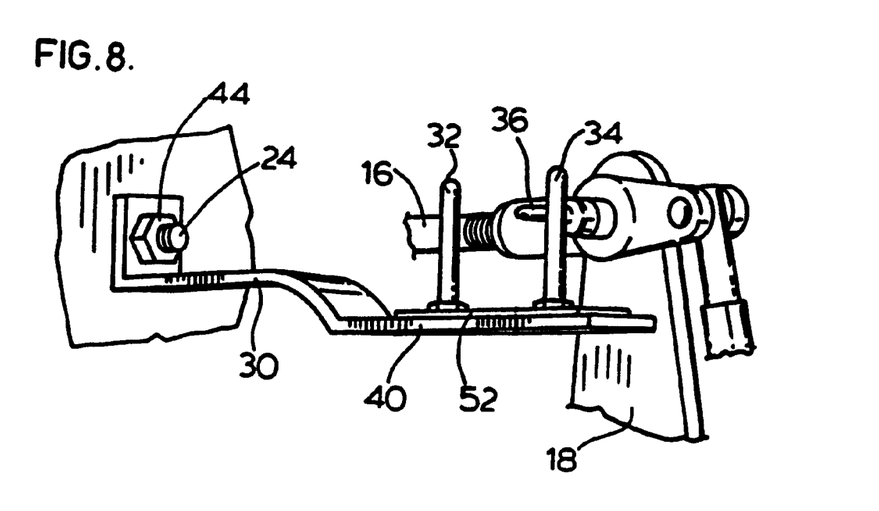
FIG. 8 is a perspective view of a brake adjustment indicator according to the instant invention when mounted on a trailer.

Preferably, as shown in FIG. 2, indicator 36 extends between reference pointers 32 and 34 so as to contact reference pointer 32 when push rod 16 is working properly and is fully retracted and so as to contact reference pointer 34 as push rod 16 travels outside its correctly adjusted range. Accordingly, as shown in FIG. 2, distal end 70 of indicator 36 may be positioned nearer bracket 30 than distal end 72 of pointers 32 and 34. Alternately, as shown in FIGS. 7 and 8, reference pointers 32 and 34 may be positioned perpendicular to indicator 36. In any event, it is preferred that indicator 36 is sufficiently long so as to contact reference pointers 32 and 34 as discussed above.

Preferably, indicator 36 and/or reference pointers 32 and 34 are flexible so that, if indicator 36 contacts reference pointer 34, one of reference pointer 34 and the indicator (or both) will deform to permit indicator 36 to travel past the reference pointer. Accordingly, as shown in dotted outline in FIG. 3, as indicator 36' contacts reference pointer 34, indicator 36' deforms as it travels past reference pointer 32. Once past reference pointer 32, indicator 36 will preferably return to its original shape. Therefore, it is preferred that indicator 36 and/or reference pointers 32 and 34 are made of a resilient material such as rubber, neoprene or the like.

In order to increase the visibility of indicator 36 and reference pointers 32 and 34, these members are preferably of a colour which contrasts with the colour of the braking system. Preferably, they have an exterior surface which is of a bright colour, such as yellow or the like. This increases the visibility of indicator 36 and reference pointers 32 and 34 to the operator.

Figure 6:
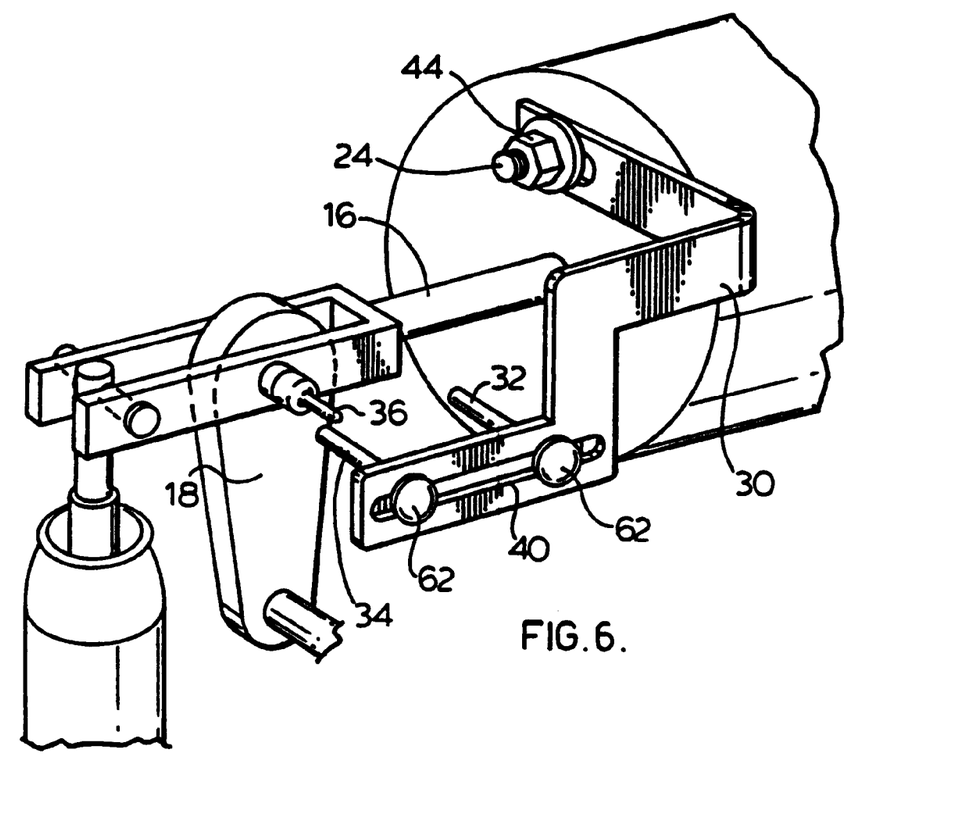
FIG. 6 is a perspective view of a brake adjustment indicator according to the instant invention mounted on a front brake of a vehicle.

In order to install the brake adjustment indicator, the vehicle is stopped, the wheels are preferably chocked and the brakes are preferably disengaged. Indicator 36 may then be affixed to clevis pin 64 of the braking system. Alternately, if clevis pin 64 is integrally manufactured with indicator 36, the clevis pin on the braking system may be replaced with an integrally formed clevis pin and indicator. Further, a clevis pin according to FIG. 9 may be installed. An appropriately configured bracket 30 is then affixed to a mounting bolt 24. FIGS. 6, 7 and 8 depict typical configurations and mountings which may be utilized. Bracket 30 is configured so that indicator 36 is positioned between reference pointers 32 and 34. As first portion 38 of bracket 30 preferably has a longitudinally extending opening, the exact position of distal ends 72 may be varied depending upon the actual construction of the brake system. The orientation of bracket 30 is also adjusted so that second portion 40 extends parallel, but distal to, push rod 16.

Reference pointers 32 and 34, if they are already positioned on second portion 40, are loosened. The reference pointers are adjusted until indicator 36 contacts (without deforming) indicator 32 (which marks the furthest inward position of travel of push rod 16 when the brakes are released). As reference pointer 34 is fixed in position relative to reference pointer 32, this will mark the furthest outward travel position of the push rod when correctly adjusted. Nuts 60 are then tightened to fix plate 52 in position relative to second portion 40.

Once the brake adjustment indicator has been installed, the operator of the vehicle may easily check the adjustment of the brakes. In order to check the degree of wear of the brakes, the operator applies the brakes and then inspects each indicator 36 to determine whether it has passed beyond the respective reference pointer 34. The operator may then chock the wheels and release the brakes. If the brakes are working properly, each indicator 36 will still be positioned adjacent the respective reference pointer 32 as shown in FIG. 2. If indicator 36 positioned between reference pointers 32 and 34, then the operator is warned that the brake may require maintenance.

By constructing reference pointers 32 and 34 and indicator 36 of a contrasting coloured material, it is easier for the operator to identify the indicators without crawling under the vehicle. Further, by constructing reference pointers 32 and 34 and indicator 36 of a flexible material and positioning indicator 36 to contact reference pointers 32 and 34, actual contact between the reference pointers and the indicator will be readily apparent to an operator without requiring the operator to be in a prescribed position to properly view the relative alignment of the reference pointers and the indicator. Further, as the brakes start to wear, excessive outward travel of pushrod 16 will result in deformation of at least one of these members. Accordingly, not only does this expedite the inspection of the brake adjustment (which may make it more likely that the operator will conduct a proper check) but it provides a more accurate indication of the actual adjustment of the brakes.

Figure 9:
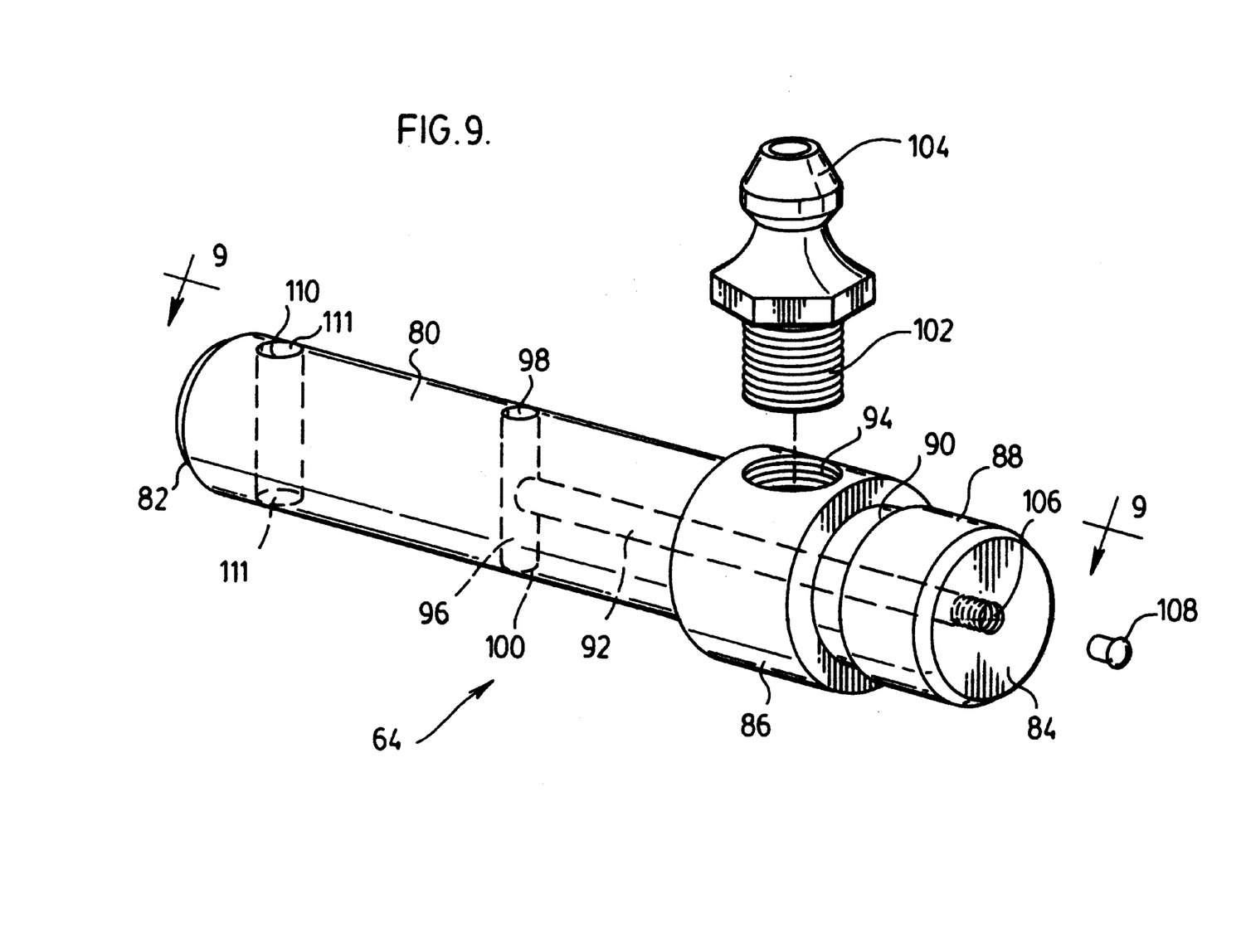
FIG. 9 is an exploded view of a clevis pin according to the instant invention.
Figure 10:
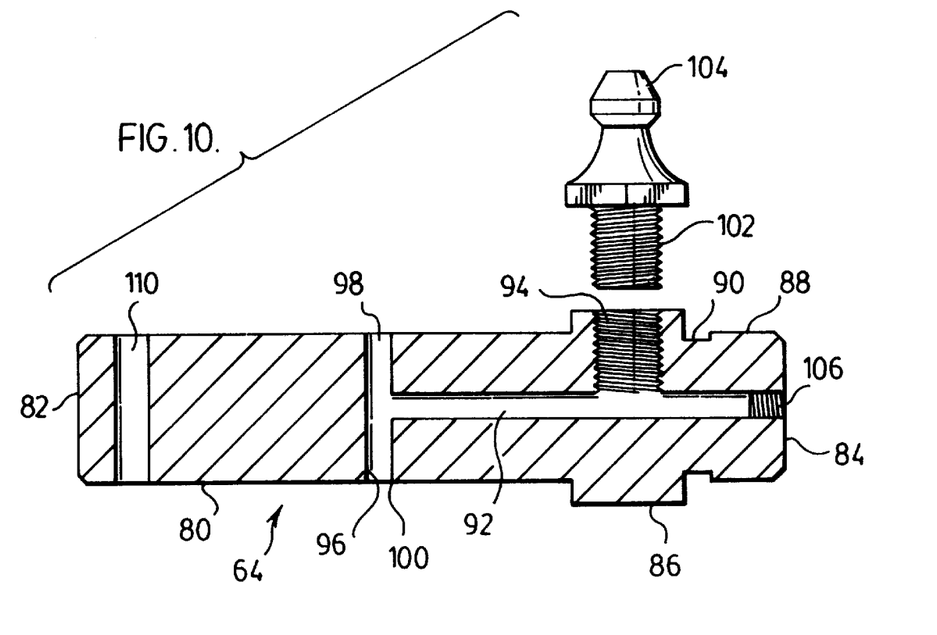
FIG. 10 is a cross-sectional view along the line 9—9 of the clevis pin of FIG. 9.
Figure 11:
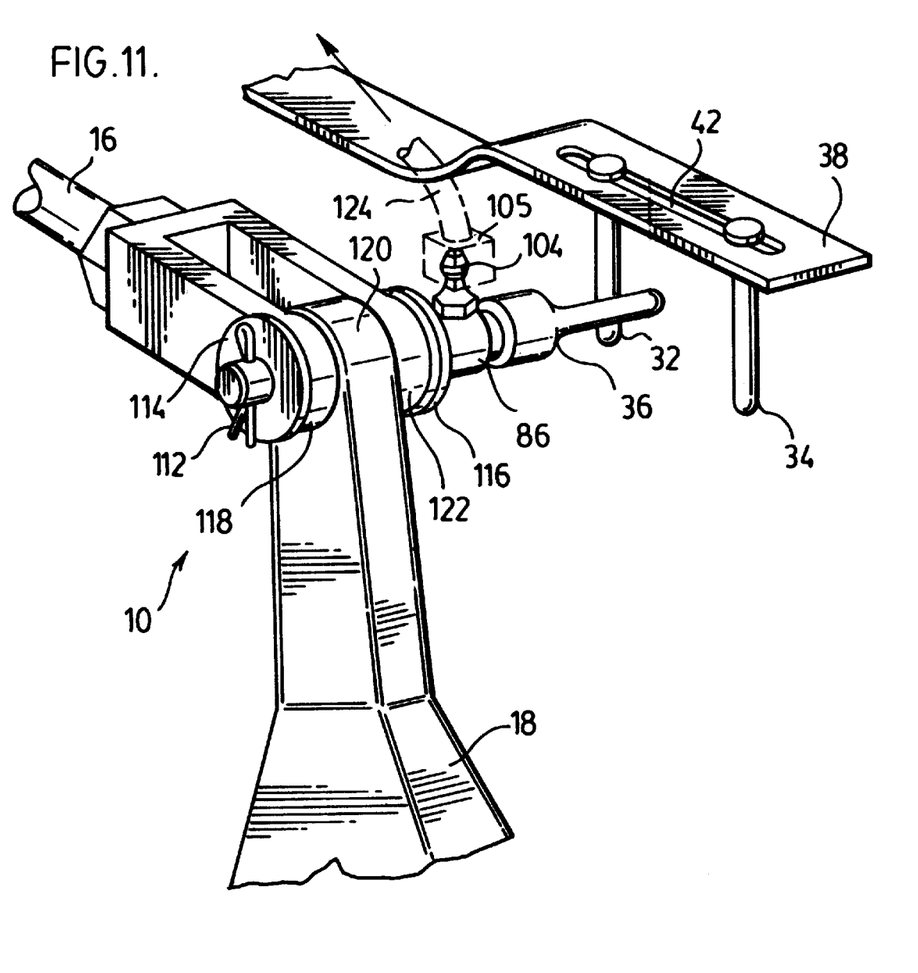
FIG. 11 is a perspective view of the clevis pin of FIG. 9 when installed within the brake adjustment indicator system of FIG. 1 and when attached to an automatic lubrication system for a vehicle.

As shown in FIGS. 9, 10 and 11 clevis pin 64 of the present invention has been designed to prevent, or reduce the tendency of, clevis pin 64 seizing in push rod 16 and/or brake arm 18. Clevis pin 64 is designed to operatively and pivotally connect yokes 118 and 122 of pushrod 16 to yoke 120 of brake arm 18 such that the contact surfaces (which define pivoting surfaces) are provided with lubricant to facilitate smooth independent movement of these brake system components.

Clevis pin 64 preferably comprises a substantially cylindrical elongate body so as to define a pivot surface for yokes 118 and 122 of pushrod 16 and yoke 120 of brake arm 18. Clevis pin 64 has an outer surface 80, a first end 84 and a second end 82.

If clevis pin 64 is to be used in conjunction with the brake adjustment indicator discussed herein, the clevis pin 64 preferably has an enlarged portion 86, preferably of cylindrical shape, located in the region of first end 84 for receiving bore 94. In this embodiment, clevis pin 64 may also have a knob 88, preferably of substantially cylindrical shape, located at first end 84 and a recessed groove 90, preferably of a circumferential nature, located between enlarged portion 86 and knob 88. Knob 88 and recessed groove 90 define a mounting base on which flexible indicator 36 may be securely attached. Alternately, indicator 36 may be integrally formed with clevis pin 64 in which case, knob 88 and groove are not required.

Clevis pin 64 is preferably provided with a lubrication channel network comprising a plurality of passageways to provide a lubricant to at least some of the pivoting surfaces and, preferably, to all of the pivoting surfaces. As shown in FIG. 9, three passageways, namely first lubricant channel 92, threaded cross-bore 94, and second lubricant channel 96 are provided. First lubricant channel 92 extends generally axially within clevis pin 64. First lubricant channel 92 may be prepared by drilling in a longitudinal fashion through first end 84 to an intermediate point between first end 84 and second end 82. Threaded cross-bore 94 extends inwardly from the outer surface of enlarged portion 86 to the axis of clevis pin 64, such that threaded cross-bore 94 is positioned over, and communicates with, first lubricant channel 92. Second lubricant channel 96 extends transversely through clevis pin 64 between lubricant holes 98 and 100. Second lubricant channel 96 intersects first lubricant channel 92 such that lubricant holes 98 and 100 on outer surface 80 are in flow communication with first lubricant channel 92.

Threaded cross-bore 94 is dimensioned to securely receive a grease fitting 102, such as a threaded grease fitting (eg. a commercially available Welsh plug). In turn, grease fitting 102 is dimensioned to receive a commercially available grease nipple 104. Accordingly, enlarged portion 86 is preferably dimensioned so that threaded cross-bore 94 provides sufficient thread depth to properly secure grease fitting 102 therein.

Threaded cross-bore 94 permits ready communication and transmittal of lubricant from grease nipple 104 to first lubricant channel 92, which in turn provides lubricant through second lubricant channel 96 to surface 80 of clevis pin 64 through lubricant holes 98 and 100. Accordingly, first lubricant channel 92, threaded cross-bore 94 and second lubricant channel 96 provide a continuous path for lubricant to flow from grease nipple 104 to outer surface 80 of clevis pin 64 adjacent lubricant holes 98 and 100.

Lubricant holes 98 and 100 are preferably located on the section of outer surface 80 of clevis pin 64 which are opposed to yokes 118 and 122 of pushrod 16 and/or yoke 120 of brake arm 18. It should be apparent that more than one second lubrication channel 96 may be provided within clevis pin 64 so as to provide additional deposits of grease at alternate locations along the length of clevis pin 64. If only one second lubrication channel 96 is provided, it is preferably positioned opposed to yoke 120 of brake arm 18.

In the embodiment of FIG. 9, a threaded axial opening 106 is provided along the inner surface of first lubrication channel 92, projecting inwardly from first end 84. Axial opening 106 is dimensioned to receive a threaded plug 108 which is preferably used to prevent lubricant from leaking out of the opening 106 during use of clevis pin 64. If flexible indicator 36 is not secured to clevis pin 64, then a grease fitting and grease nipple may be secured within axial opening 106 as an alternative to the use of threaded bore 94.

Preferably a retention channel 110 having ends 111 extends through clevis pin 64, transversely to the axis of clevis pin 64 with both ends 111 communicating with outer surface 80 in the region of second end 82. Retention channel 110 is adaptable to receive a retention member such as a cotter pin. Accordingly, clevis pin 64 may be removably mounted within the yokes of push rod 16 and brake arm 18.

FIG. 11 shows clevis pin 64 installed and in use with vehicle brake adjustment indicator system 10. When it is desired to grease clevis pin 64, a grease gun or a greasing tube 109 of an automatic greasing system of a truck may be affixed to grease nipple 104 which in turn provides lubricant automatically to outer surface 80 of clevis pin 64 adjacent lubricant holes 98 and 100. As the yokes of pushrod 16 and the yoke of brake arm 18 rotate around clevis pin 64 during the operation of brake system, grease is distributed along the section of outer surface 80 which is in direct moveable contact with the yokes of pushrod 16 and brake arm 18.

Cotter pin 112 at second end 82 of clevis pin 64 is shown providing retention for clevis pin 64 within the yokes of push rod 16 and brake arm 18.

Spacer rings 114 and 116 may be provided as shown, each having an inner diameter which conforms to the diameter of outer surface 80 of clevis pin 64. Accordingly, spacer ring 114 may be positioned between cotter pin 112 and first yoke 118 of pushrod 16; yoke 120 of brake arm 18 may be operatively connected to clevis pin 64 between first and second yokes 118 and 122 of pushrod 16; and, spacer ring 116 may be positioned between second yoke 122 and enlarged portion 86.

As shown, knob 88 is provided at first end 84 of clevis pin 64. Knob 88 with recessed grove 90 together provide a mounting base on which flexible indicator 36 may be securely attached. Since flexible indicator 36 consists of a hollow elastomeric member, when opening 66 is placed over knob 88, outer edge of opening 66 may be secured within recessed groove 90 due to the elasticity of flexible indicator 36.

Grease nipple 104 may be attached to an automatic greasing system for a truck in order to ensure a regular and continuous supply of lubricant to clevis pin 64 through a greasing tube 124. Automatic greasing systems are typically run by electronic control units which control the sequence interval and the pressurization time of the lubricant delivery to parts within a truck. Fixed doses of lubricant can be supplied by the system through greasing tube 124 to meet the particular lubricant need of clevis pin 64. In this way, regular lubrication of clevis pin 64 will reduce the seizing of clevis pin 64 within the yokes of pushrod 16 or brake arm 18.

It will be appreciated by those skilled in the art that other modifications may be made to the brake adjustment indicator and are within the scope of this invention.

I claim:

1. In a braking system for a vehicle including a pressure chamber, a pushrod extending longitudinally outwards from the pressure chamber and movable when correctly adjusted between first and second positions, a brake assembly for braking the vehicle and a pivot member for pivotally mounting a portion of the brake assembly to a portion of the pushrod, the improvement comprising:
    (a) an indicator adapted to be mounted for longitudinal movement with the pushrod;
    (b) a support member having a first portion and a second portion, the first portion adapted to be mounted to the vehicle, the support member configured to position the second portion opposite to the indicator;
    (c) a first reference member positionable on the second portion of the support member for marking the first position and a second reference member positionable on the second portion of the support member for marking the second position;
    (d) a locating member for positioning the first reference member in a preselected position relative to the second reference member;
    (e) at least one locking member for releasably mounting the first and second reference members on the second portion, the locking member moveable between a first position in which the first and second reference members are fixed in position on the second portion of the support member and a second position in which the first and second reference members are movable as a unit with respect to the indicator on the second portion; and,
    (f) the pivot member comprising a clevis pin having an outer surface, first and second ends and at least one lubrication channel for providing grease to the outer surface adjacent at least one of the portion of the brake assembly pivotally mounted on the clevis pin and the portion of the pushrod pivotally mounted on the clevis pin wherein the indicator is mounted on one end of the clevis pin.

2. The braking system as claimed in claim 1 wherein the clevis pin comprises a substantially cylindrical elongate body having:
    (a) a bore adapted to receive a grease nipple; and,
    (b) a lubrication channel network extending from the bore to the outer surface of the clevis pin.

3. The braking system as claimed in claim 1 wherein the clevis pin comprises a substantially cylindrical elongate body having:
    (a) a bore adapted to receive a grease nipple and extending inwardly from the outer surface in the region of one of the ends; and,
    (b) a lubrication channel network which extends through the body, one end of which is positioned under, and which communicates with, the bore and at least one other end of which communicates with the outer surface at a point offset from the bore in the direction of the other end.

4. The braking system as claimed in claim 1 wherein the clevis pin has a grease nipple adapted for receiving lubricant from an automatic greasing system for the vehicle.

5. In a braking system for a vehicle including a pressure chamber, a pushrod extending longitudinally outwards from the pressure chamber and movable when correctly adjusted between first and second positions, a brake assembly for braking the vehicle and a pivot member for pivotally mounting a portion of the brake assembly to a portion of the pushrod, the improvement comprising:
    (a) an indicator adapted to be mounted for longitudinal movement with the pushrod;
    (b) a reference member for marking one of the first and the second positions, the reference member mounted in an opposed position to the indicator; and,
    (c) the pivot member comprising a clevis pin having an outer surface, first and second ends and at least one lubrication channel for providing grease to the outer surface adjacent at least one the portion of the brake assembly pivotally mounted on the clevis pin and the portion of the pushrod pivotally mounted on the clevis pin wherein the indicator is mounted on one end of the clevis pin.

6. The braking system as claimed in claim 5 wherein the clevis pin comprises a substantially cylindrical elongate body having:
    (a) a bore adapted to receive a grease nipple; and,
    (b) a lubrication channel network extending from the bore to the outer surface of the clevis pin.

7. The braking system as claimed in claim 5 wherein the clevis pin comprises a substantially cylindrical elongate body having:
    (a) a bore adapted to receive a grease nipple and extending inwardly from the outer surface in the region of one of the ends; and,
    (b) a lubrication channel network which extends through the body, one end of which is positioned under, and which communicates with, the bore and at least one other end of which communicates with the outer surface at a point offset from the bore in the direction of the other end.

8. The braking system as claimed in claim 5 wherein the clevis pin has a grease nipple adapted for receiving lubricant from an automatic greasing system for the vehicle.

9. In a braking system for a vehicle including a pressure chamber, a pushrod extending longitudinally outwards from the pressure chamber and movable when correctly adjusted between first and second positions, a brake assembly for braking the vehicle and a pivot member for pivotally mounting a portion of the brake assembly to a portion of the pushrod, the pivot member and the portions of the brake assembly and the pushrod defining pivoting surfaces, the improvement comprising a clevis pin having:
    (a) the pivot member comprising a clevis pin having a substantially cylindrical axially extending elongate body having an outer surface and first and second ends;
    (b) a bore adapted to receive a grease nipple and extending inwardly from an outer portion of the clevis pin in the region of the first end; and,
    (c) a lubrication channel network which extends through the body, one end of which communicates with the bore and at least one other end of which communicates with the outer surface at a point offset from the bore in the direction of the second end wherein the first lubrication channel extends from the first end of the clevis pin towards the second end the bore for receiving the grease nipple extends from the outer surface of the clevis pin to intersect the first lubricant channel and the first end of the first lubrication channel is provided with a lubricant plug which securely plugs the first end of the first lubrication channel.

10. The braking system as claimed in claim 9 wherein the grease nipple is adapted for receiving lubricant from an automatic greasing system for the vehicle, whereby on application of the automatic greasing system for the vehicle, the pivoting surfaces are lubricated.

11. The braking system as claimed in 9 wherein the lubrication channel network comprises:

(a) a first lubricant channel having a first end and a second end and extending axially within the elongate body, the first lubricant channel communicating with the bore; and, (c) a second lubricant channel having a first end and a second end and extending transversely through the cylindrical body, the second lubricant channel intersecting the first lubricant channel to be in communication therewith, at least one of the first and second ends of the second lubricant channel positioned adjacent the outer surface of the clevis pin to communicate therewith.

12. The braking system as claimed in 9 wherein the first lubrication channel extends from the first end of the clevis pin towards the second end and the bore for receiving the grease nipple is positioned in the first end.

13. The braking system as claimed in 9 wherein the elongate body of the clevis pin also comprises an enlarged portion which is sized to accommodate the bore which is positioned therein and extends from the surface of the enlarged portion.

14. The braking system as claimed in 9 wherein a retention cross-bore which is adapted to receive an axial retention member extends through and transversely to the axis of the cylindrical body in the region of one of the ends, the retention cross-bore having first and second ends which communicate with the outer surface.

15. The braking system as claimed in 14 wherein a retention cross-bore is positioned on the second end of the clevis pin.

16. The braking system as claimed in 14 wherein the axial retention member is a cotter pin.

* * * * *